(12) United States Patent
Aoki et al.

(10) Patent No.: US 6,224,169 B1
(45) Date of Patent: May 1, 2001

(54) INTEGRATED BRAKE FLUID CONTROL ELECTRICAL CONNECTION APPARATUS

(75) Inventors: Katsunori Aoki; Teruhisa Kohno; Seiji Ueda, all of Hyogo (JP)

(73) Assignee: Sumitomo Electric Industries Ltd., Osaka (JP)

( * ) Notice: Subject to any disclaimer, the term of this patent is extended or adjusted under 35 U.S.C. 154(b) by 0 days.

(21) Appl. No.: 09/204,290

(22) Filed: Dec. 3, 1998

(30) Foreign Application Priority Data

Dec. 4, 1997 (JP) .................................................... 9-334423

(51) Int. Cl.⁷ .................................................... B60T 8/36
(52) U.S. Cl. .................................... 303/116.4; 303/119.3; 303/DIG. 10
(58) Field of Search ............................. 303/116.4, 119.3, 303/DIG. 10

(56) References Cited

U.S. PATENT DOCUMENTS

| 5,407,260 | * | 4/1995 | Isshiki et al. ...................... 303/119.2 |
| 5,452,948 | * | 9/1995 | Cooper et al. ...................... 303/119.2 |
| 5,466,055 | | 11/1995 | Schmitt et al. . |
| 5,668,422 | | 9/1997 | Deynet . |
| 5,895,207 | | 4/1999 | Burgdorf et al. . |
| 5,957,547 | * | 9/1999 | Schliebe et al. ................... 303/119.3 |
| 6,059,381 | * | 5/2000 | Bayer ................................. 303/119.3 |

FOREIGN PATENT DOCUMENTS

| 4320005 | 1/1995 | (DE) . |
| 7500068 | 1/1995 | (JP) . |
| 8-11691 | 1/1996 | (JP) . |
| 9-98559 | 4/1997 | (JP) . |
| 93/08050 | 4/1993 | (WO) . |
| 94/27045 | 11/1994 | (WO) . |
| 95/21758 | 8/1995 | (WO) . |

* cited by examiner

Primary Examiner—Matthew C. Graham
(74) Attorney, Agent, or Firm—Greenblum & Bernstein P.L.C.

(57) ABSTRACT

A brake fluid pressure control apparatus for vehicles comprises an electric motor mounted on one side of a housing, an electronic control box mounted on the other side of the housing, and conductive members extending from the electronic control box. The conductive members are inserted in through holes of the housing, and have motor connection male terminals at tip ends thereof. Motor connection male terminals are accommodated in motor accommodation portions provided in the electric motor. The motor connection female terminals and the motor connection male terminals are engaged for electrical connection.

8 Claims, 11 Drawing Sheets

INTEGRATED BRAKE FLUID CONTROL ELECTRICAL CONNECTION APPARATUS

BACKGROUND OF THE INVENTION

The present invention relates to a brake fluid control apparatus for vehicles, which is used for brake fluid pressure control such as antilock brake control and traction control.

Such kind of brake fluid control apparatus generally has following construction for reducing size, weight and cost. Namely, an electric motor for actuating a pump is mounted on one side of a housing in which devices for fluid pressure control such as the pump and electromagnetic valves are accommodated and passages are formed. Further, on the other side of the housing, an electronic control box provided with a connector for connecting a control circuit board to a battery is mounted.

In such construction, the electric motor mounted on one side of the housing and the electronic control box mounted on the other side of the housing need to be electrically connected with each other. However, in the case that the electric motor and the electronic control box are electrically connected by lead wires wired out of the housing, size and weight of the apparatus are increased. Further, in this case, since the lead wires need to be connected to the electric motor and the electronic control box by watertight connectors, cost of the apparatus is increased.

In order to solve this problem, various types of brake fluid control apparatuses are provided. In such apparatuses, through bores elongated from one side to the other side of a housing are formed. An electric motor and an electronic control box are connected with each other by conductive members inserted in the through bores.

For example, in a brake fluid pressure control apparatus for vehicles disclosed in Japanese National Publication No.7-500068 which is the translated version of PCT application PCT/DE92/00738, pipes are inserted in bores, which are formed in a housing and elongated from one side to the other side of the housing. Inside each of the pipes, two lead wires extending from an electric motor and an electronic control box are connected with each other by means of plug.

Further, in a brake fluid pressure control apparatus for vehicles disclosed in Germany Patent DE4320005A1, lead wires elongated from a brash base of an electric motor are inserted in through bores formed in a housing for connection to an electronic control box by means of connector.

However, as above mentioned lead wires have flexibility, operation for connection of the wires need to be executed after finishing operation for inserting the lead wires through the through bores. Further due to the same reason, in order to execute the operation for connection, the length of the lead wires is set so that each of them has an extra portion, and space for accommodating the extra portion is necessary. This results in increase of size of the apparatus. Additionally, in the apparatus disclosed in the Japanese National Publication No.7-500068, since the lead wires extending from the electric motor are pulled out from a motor body, it needs that the motor body is provided with a portion for pulling out the lead wires and the connection of lead wires with the pipes is watertight structure, resulting in cost increasing.

On the other hand, in a brake fluid pressure control apparatus for vehicles disclosed in Japanese Laid-Open Publication No.8-11691, shaft-like conductive members connected to an electric motor are inserted in through bores formed in a housing, and the conductive members are connected to another conductive members in an electronic control box by means of welding or cramping. However, in this apparatus, since the electric motor and the electronic control box are firmly fixed to each other, replacement of the electric motor and the electronic control is difficult after finishing assembly of the apparatus.

Figure 9:
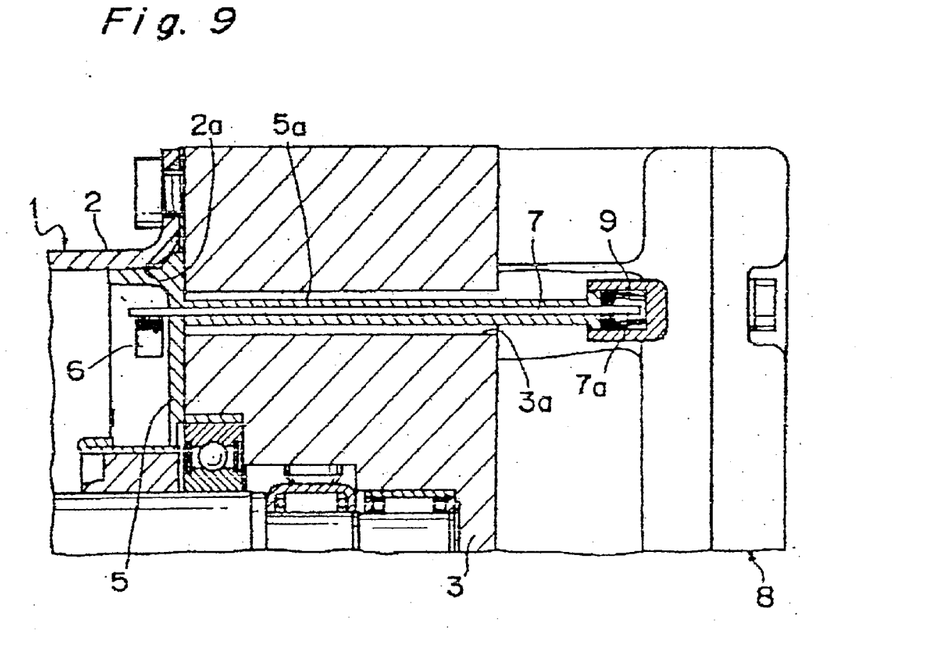
FIG. 9 is a partial sectional view of a conventional fluid pressure control apparatus for vehicles.

In above-mentioned Germany Patent DE4320005A1, a brake fluid pressure control apparatus as shown in FIG. 9 is disclosed. In this apparatus, an opening 2a of the case 2 abutting on a housing 3 is closed by a cover 5 made of insulation plastic having a tubular portion 5a inserted in a through bore 3a of the housing 3. In the tubular potion 5a, a conductive member 7 is inserted. The conductive member 7 has a base end connected to a rectifier 6 and a tip end constituting a male terminal 7a. The male terminal 7a is engaged and connected with a female terminal 9 in an electronic control box 8. In this construction, since the male terminal 7a and the female terminal 9 are connected in releasable manner, even assembly of the apparatus is finished, the electric motor 1 and the electronic control box 8 can be released from the housing 3 for replacement.

Same construction is also disclosed in Japanese Laid-Open Publication No. 9-98559.

However, in such a construction as that the brake fluid control apparatus has the male terminal 7a of the electric motor 7 and the female terminal 9 of the electronic control box 8 shown in FIG. 9, there are still following problems.

Figure 10:
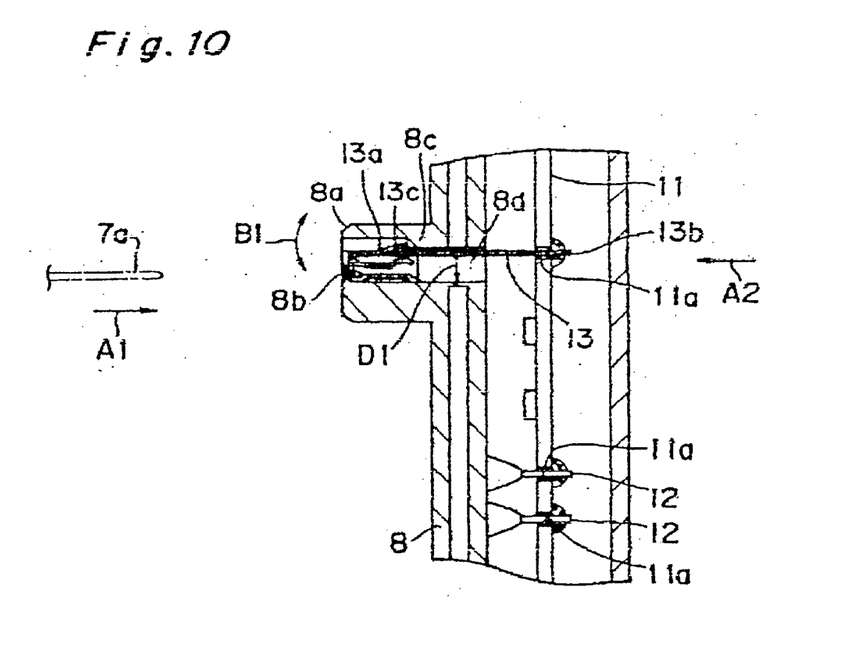
FIG. 10 is a partial enlarged sectional view for explaining problems of the conventional fluid pressure control apparatus.

As shown in FIG. 10, terminals 12 of devices such as an electromagnetic valve are inserted in through holes 11a of a control circuit substrate 11 accommodated in an electronic control box 8 and soldered to it. Similarly, a male terminal 13b formed at one end of a conductive member 13 having a female terminal 13a (corresponding to the female terminal 9 in FIG. 9) at the other end thereof is inserted in the through hole 11a and welded to the control circuit substrate 11. The female terminal 13a is inserted in a terminal accommodation aperture 8b formed in a terminal accommodation portion 8a of the electronic control box 8. Since the thickness of the female terminal 13a is larger than that of the male terminal 13b, insertion direction of the female terminal 13a to the terminal accommodation aperture 8b (indicated by an arrow "A2") is opposed to a direction in which the male terminal 7a of the electric motor is plugged into the female terminal 7b (indicated by an arrow "A1"). The male terminal 7a is held in the terminal accommodation aperture 8b by engagement of an engagement flap 13c and a step portion 3c of the terminal accommodation aperture 8b. Accordingly, the width "D1" of the terminal accommodation aperture 8b at a portion 8d opposing to the control circuit substrate 11 should be set large for insertion of the female terminal 13a to the terminal accommodation aperture 8b. However, the large width "D1" results in that looseness of the female terminal 13a in a direction indicated by an arrow "B1" is increased and that position of the male terminal 13b with respect to the electronic control box 8 is not determined firmly. When the control circuit substrate 11 is assembled to the electronic control box 8, the terminals 12 of the electromagnetic valves and the male terminal 13b of the conductive member 13 should be simultaneously inserted in the through holes 11a. Therefor, unstable position of the male terminal 13b makes the assembly of the control circuit substrate 11 to the electronic control box 8 considerably difficult.

Figure 11:
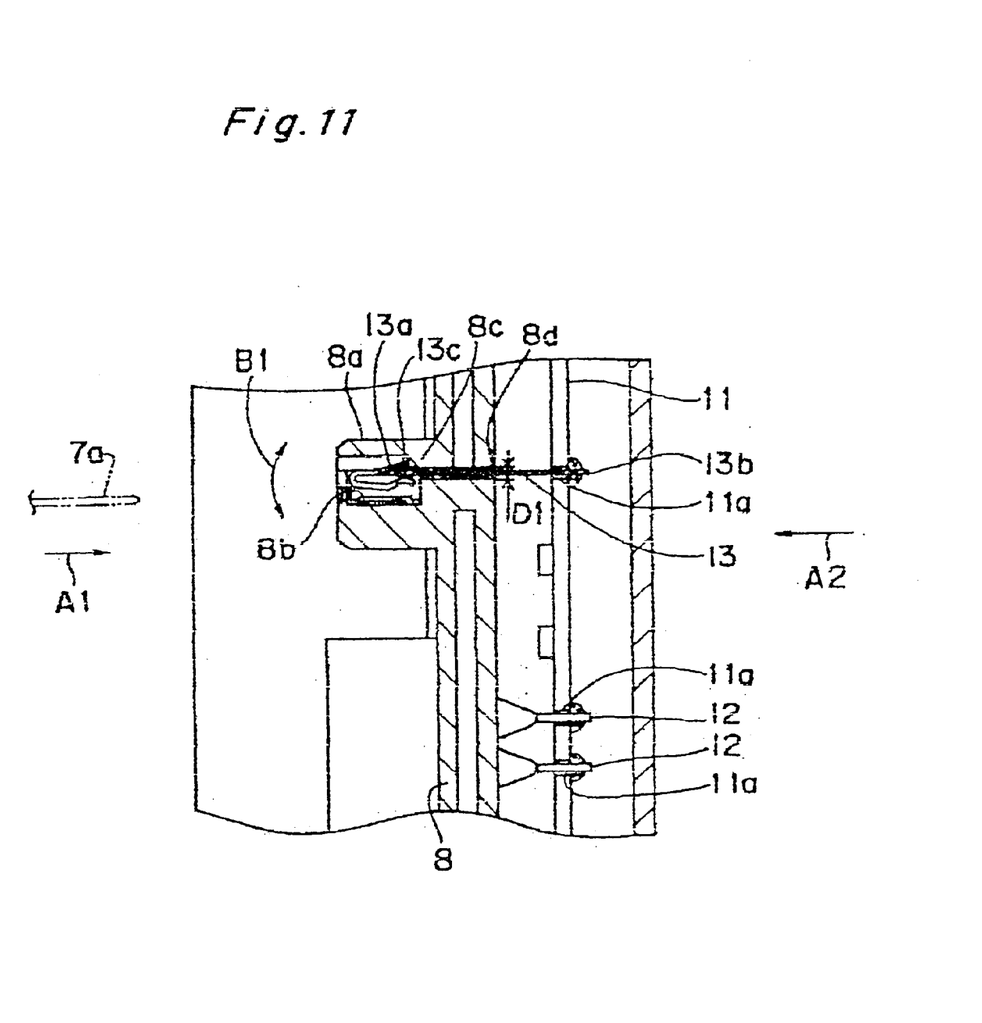
FIG. 11 is a partial enlarged sectional view for explaining problems of other conventional fluid pressure control apparatuses.

On the other hand, as shown in FIG. 11, the width "D1" of the terminal accommodation aperture 8b at the portion 8d opposing to the control circuit substrate 11 can be set small. In this case, the female terminal 13a of the conductive member 13 is inserted in the terminal accommodation aperture 8*b* in the direction as same as the insertion direction of the male terminal 7*a* indicated by the arrow "A1". However, in this case, the female terminal 13*a* is almost entirely fixed to the terminal accommodating aperture 8*b*, so that the female terminal 13*a* hardly moves in the direction indicated by the arrow "B1". Therefor, in this case, engagement of the male terminal 7*a* of the electric motor with the female terminal 13*a* is considerably difficult.

Figure 12:
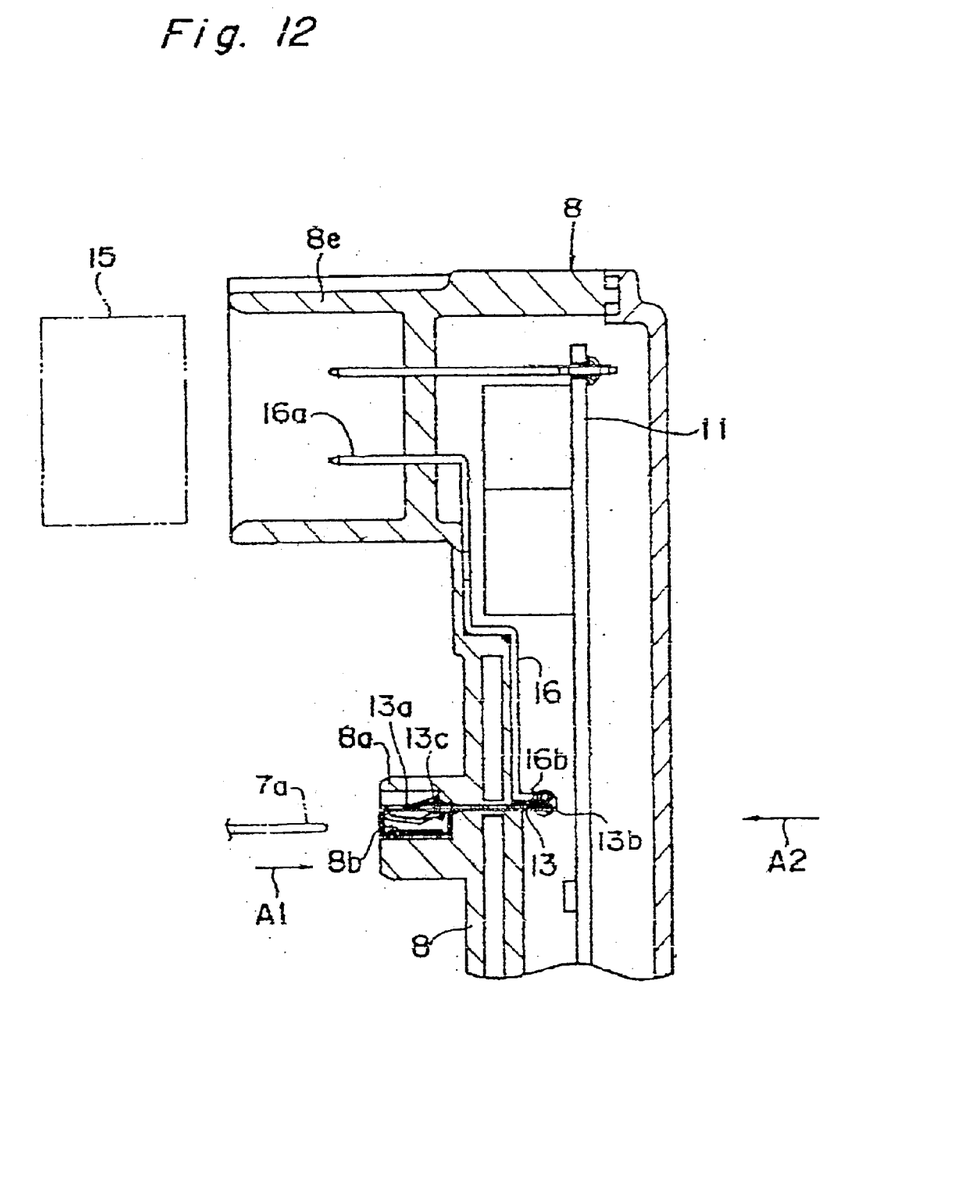
FIG. 12 is a partial enlarged sectional view for explaining problems of other conventional fluid pressure control apparatuses.

Further, as shown in FIG. 12, in order to decrease the size of the electronic control box 8, a connector portion 8*e* for connection to a battery (not shown) provided with the electronic control box 8 is formed so that a corresponding connector 15 can be plugged into it in the same direction as the insertion direction of the male terminal 7*a* of the electronic control box 8 indicated by the arrow "A1".

However, in the case that the female terminal 13*a* of the conductive member 13 is inserted in the direction of the arrow "A1", insertion direction of the female terminal 13*a* is opposing to the insertion direction of the terminal 16*a* of the connector portion 8*e* indicated by the arrow "A2". Therefor, the female terminal 13*a* and the terminal 16*a* can not be formed integrally as one conductive member. Namely, it is necessary that the terminal 16*a* is formed at one end of a conductive member and a terminal 16*b* is formed at the other end thereof. Further, the terminal 16*b* is connected with the male terminal 13*b* of the conductive member 13 by means of welding or soldering. This necessity for connecting the male terminal 13*b* and the terminal 16*b* increases cost and considerably decreases reliability.

SUMMARY OF THE INVENTION

Accordingly, with a view to obviating the above described drawbacks of the conventional brake fluid pressure control apparatus for vehicles, an object of the invention is to decrease size, weight and cost of a brake fluid pressure control apparatus for vehicles.

In order to accomplish this object, the present invention provides a brake fluid pressure control apparatus for vehicles comprising: a housing accommodating a pump and having through bores which elongate from one side to the other side thereof; an electric motor for actuating the pump mounted on the one side of the housing; an electronic control box mounted on the other side of the housing and having a control circuit which comprises a driving circuit for the electric motor and a connector portion which has terminals for connection to a battery; the electronic control box and the electric motor being connected electrically by conductive members inserted in the through holes; wherein each of the conductive members elongated from the electronic control box and inserted in the through bores has a motor connection male terminal on its tip end, wherein male terminal accommodation portions are provide with the electric motor, in which motor connection male terminals are accommodated, and wherein the motor connection male terminals are plugged in the motor connection female terminal for electrical connection.

In the brake fluid pressure control apparatus of the present invention having above mentioned construction, electrical connection between the electric motor and the electronic control box is achieved by engagement between the motor connection female terminal and the motor connection male terminal in easily releasable manner. Therefor, although the assembly of the apparatus is finished, the electric motor and the electronic control box can be easily released for replacement.

Further, male terminals, namely the motor connection male terminals are connected to the electronic control box resulting in needles of clearance. Thus, the motor connection male terminals can be surely connected to the control circuit in the electronic control box.

Preferably, the electronic control box is made of insulation plastic. The projections inserted in the through bores are integrally formed on parts of the electronic control box. Each conductive member is inserted in an insertion bore formed in each projection. This constriction results in decreasing the total number of parts.

Alternatively, the projections inserted in the through bores are formed separately to the electronic control box. Each conductive member is inserted in the insertion bore formed in each projection.

Preferably, the electric motor is provided with brush bases in order to hold brushes for feeding electric current to rectifiers. Each brush base is formed with the female terminal accommodation portion. Each motor connection female terminal accommodated in the female terminal accommodation portion is electrically connected to the brush. Owing to the terminal accommodation portion provided in the brush base, the total number of parts is decreased Concretely, the brake fluid control apparatus for vehicles further comprises a control circuit substrate provided with the control circuit. A conductive member formed with the motor connection male terminal at one end and a substrate insertion terminal at the other end. The substrate insertion terminal is inserted in a through hole provided in the control circuit substrate and soldered to the control circuit substrate.

The connector portion of the electronic control box is positioned outward to the housing and opened toward the other side of the housing on which the electric motor is mounted. The conductive member having the motor connection male terminal at one end is provided with a connector male terminal at the other end to form an arch-like configuration. The motor connection male terminal is inserted in the insertion bore of the projection and the connector terminal is pressed in the connector portion.

In such construction, since insertion directions of the connector male terminal and the motor connection male terminal correspond with each other, pressing-in of the connector male terminal and insertion of the motor connection male terminal can be executed simultaneously.

More concretely, the control circuit is formed on a control circuit substrate. The connector portion of the electronic control box is positioned outward to the housing and opened toward the other side of the housing on which the electric motor is mounted. A plus conductive member provided with the motor connection terminal at one end is provided with a substrate insertion male terminal at the other end. The substrate insertion male terminal is inserted into a through hole formed in the control circuit substrate and soldered to it. A minus electric conductive member provided with the motor connection male terminal at one end is provided with a connector terminal at the other end. The minus conductive member has an arch-like configuration. The motor connection male terminal is inserted in the insertion bore of the projection and the connector male terminal is pressed in the connector portion.

Preferably, the pump is a horizontal opposite and reciprocating type plunger pump having two plungers. The plunger pump is arranged in the housing so that an axis thereof is parallel to both one side and the other side of the housing. The electromagnetic valves are accommodated in accommodation bores bored from the other side toward one side and parallel to the axis taking view from the other side. The through holes are formed in regions surrounded by the plunger pump and the electromagnetic valves taking view from the other side of the housing and parallel to the electromagnetic valves. In such construction, an inner space of the housing can be effectively used, resulting in decrease the size of the housing.

BRIEF DESCRIPTION OF THE DRAWINGS

Other object and feature of the present invention will come clear from the following detail description with respect to the accompanying drawings in which.

DETAILED DESCRIPTION OF THE PREFERRED EMBODIMENTS

Figure 1A:
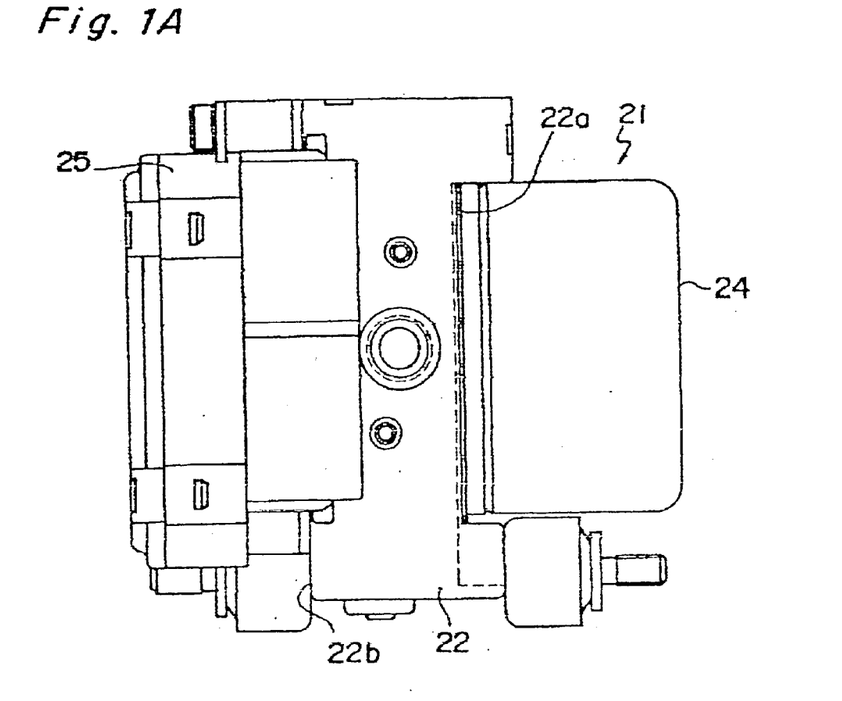
FIG. 1A is a front view of brake fluid pressure control apparatus for vehicles of the present invention.
Figure 1B:
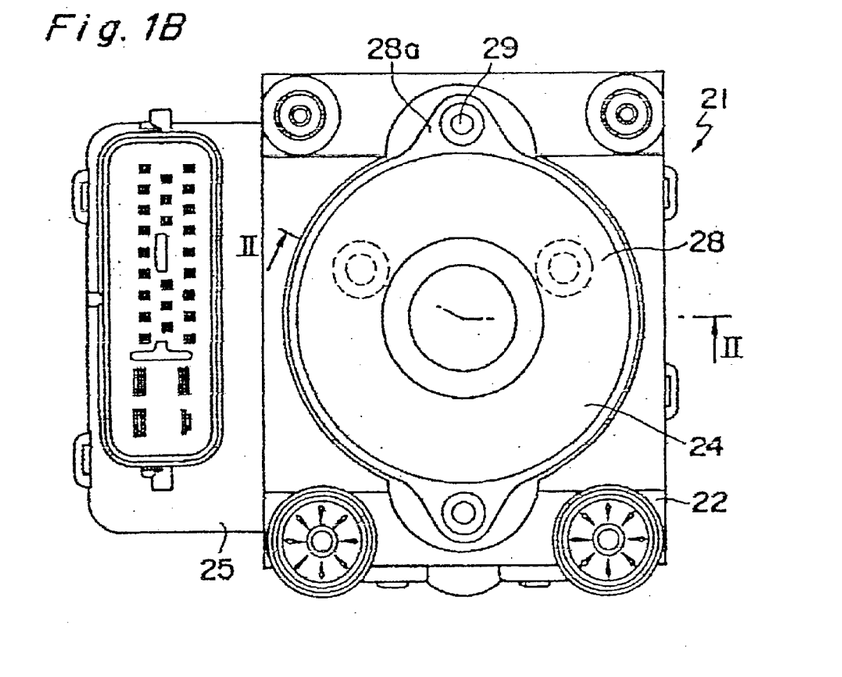
FIG. 1B is a right side view of the brake fluid pressure control apparatus for vehicles.
Figure 2:
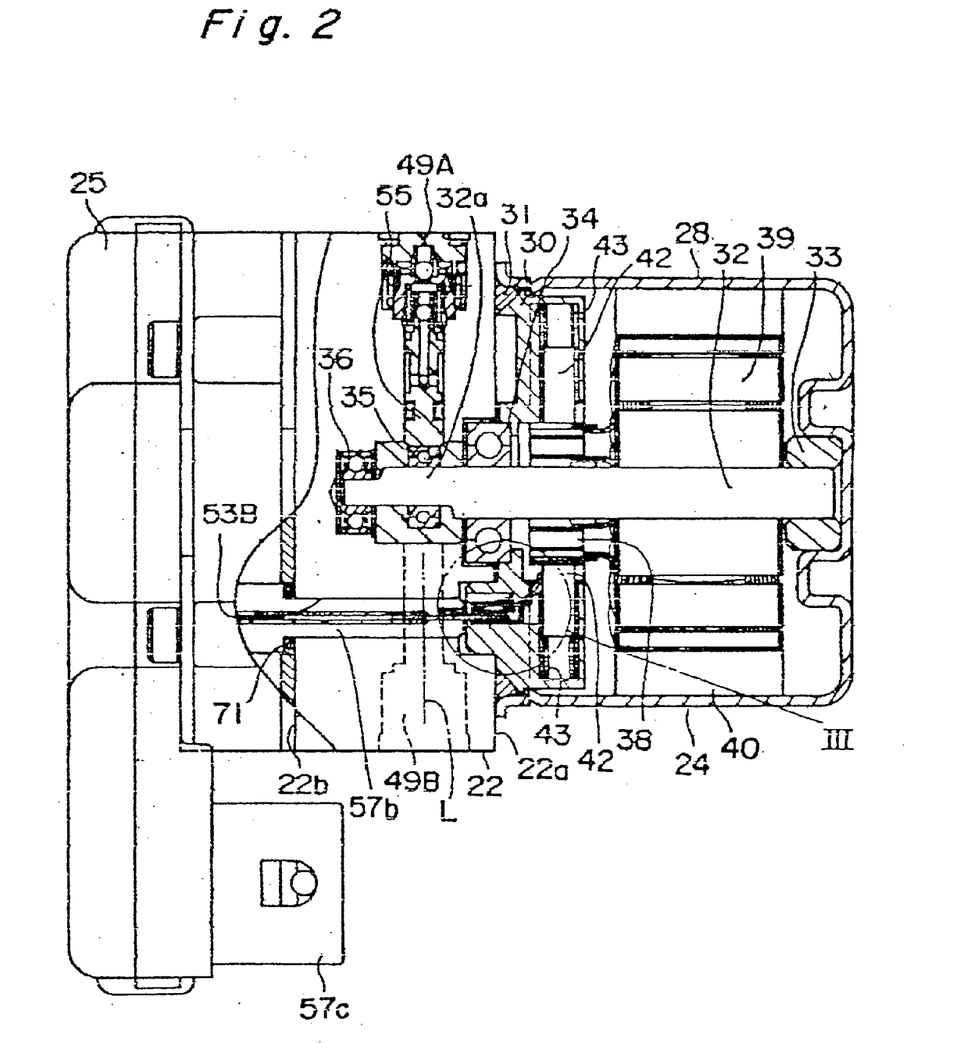
FIG. 2 is a partial sectional front view taken along the line II—II of FIG. 1A.
Figure 3:
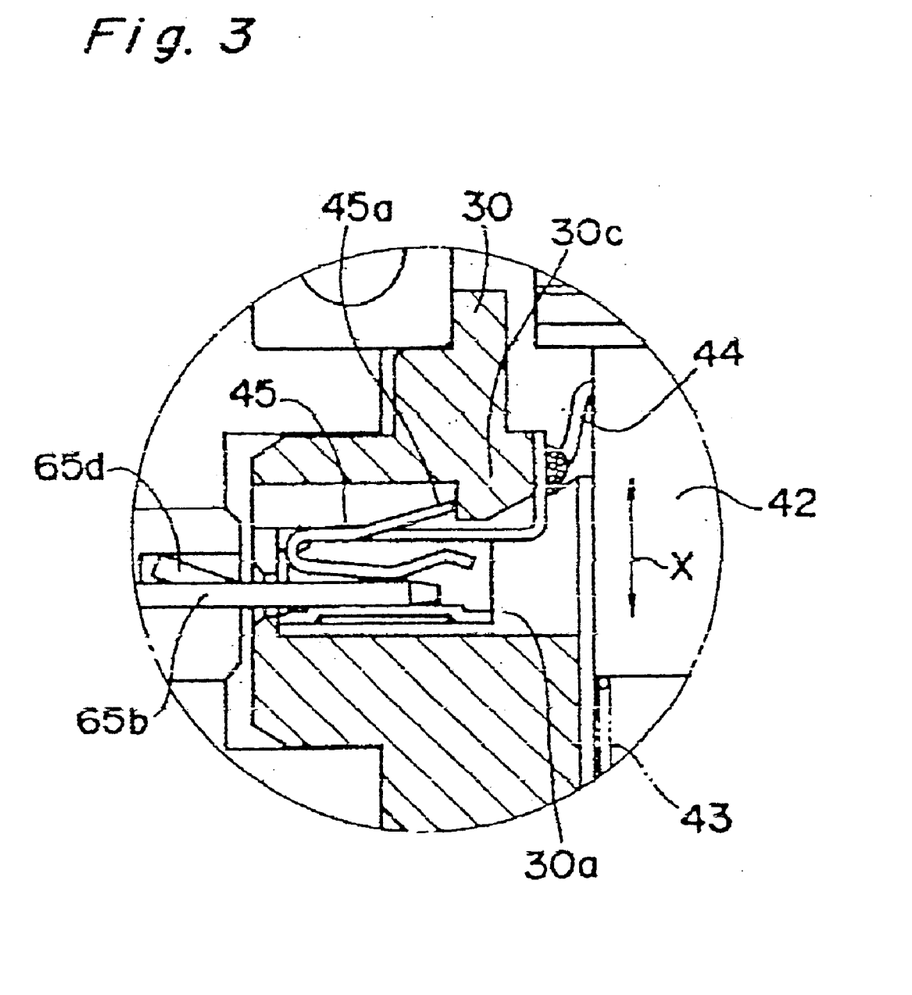
FIG. 3 is an enlarged view of a portion III in FIG. 2.
Figure 4A:
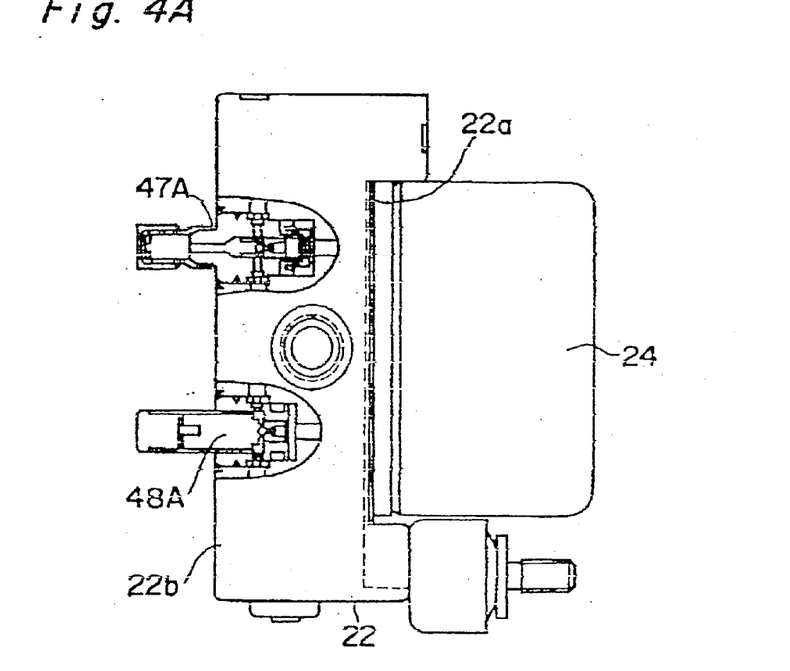
FIG. 4A is a front view of a housing.
Figure 4B:
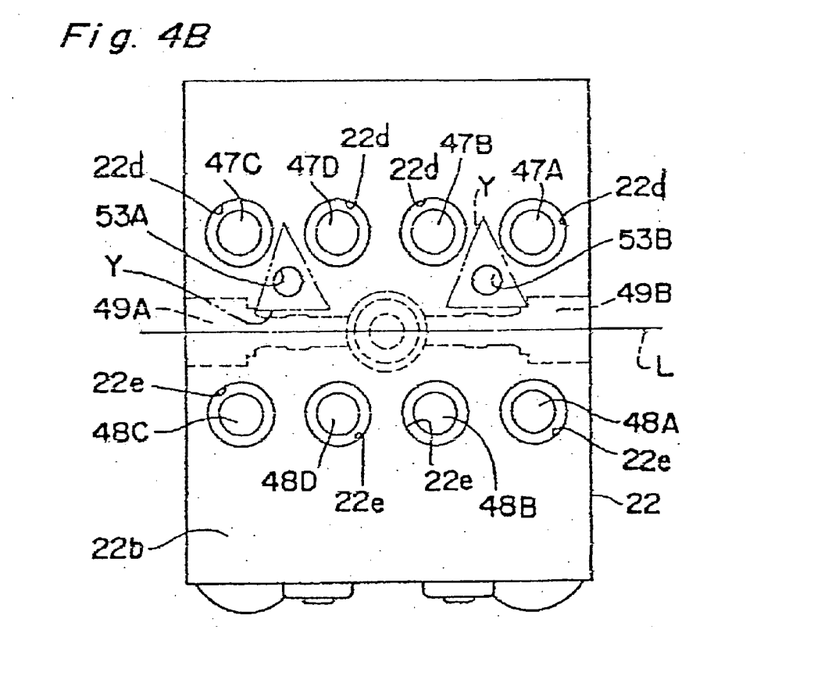
FIG. 4B is a left side view of the housing.
Figure 5A:
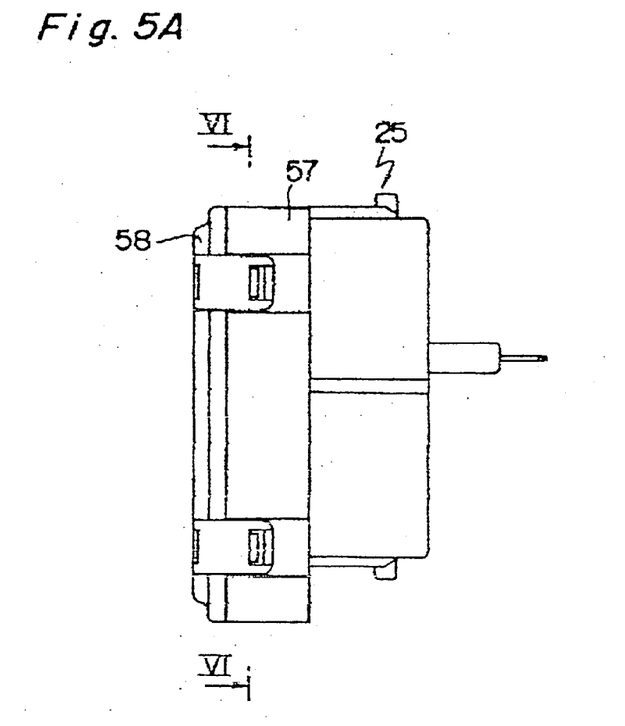
FIG. 5A is a front view of an electronic control box.
Figure 5B:
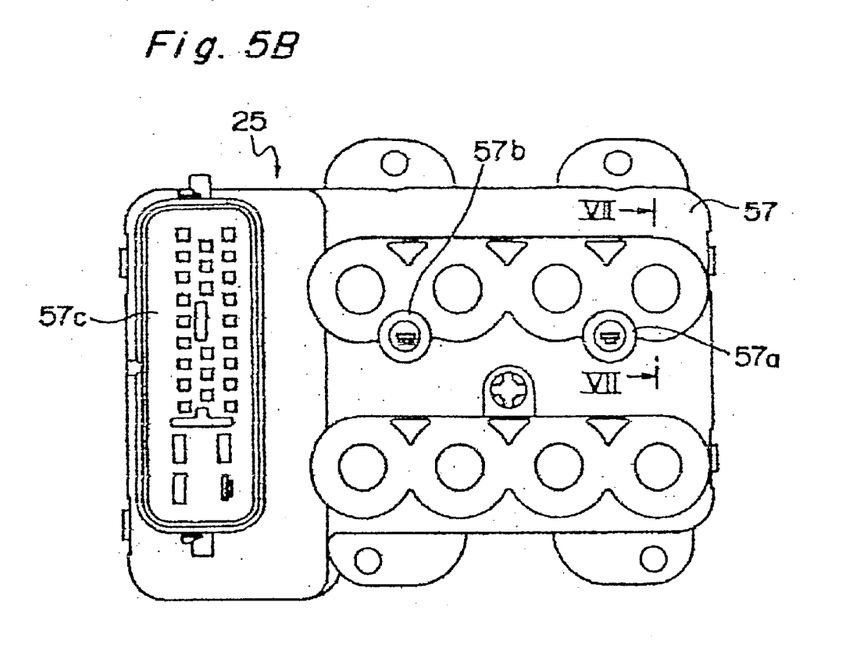
FIG. 5B is a right side view of the electronic control box.
Figure 6A:
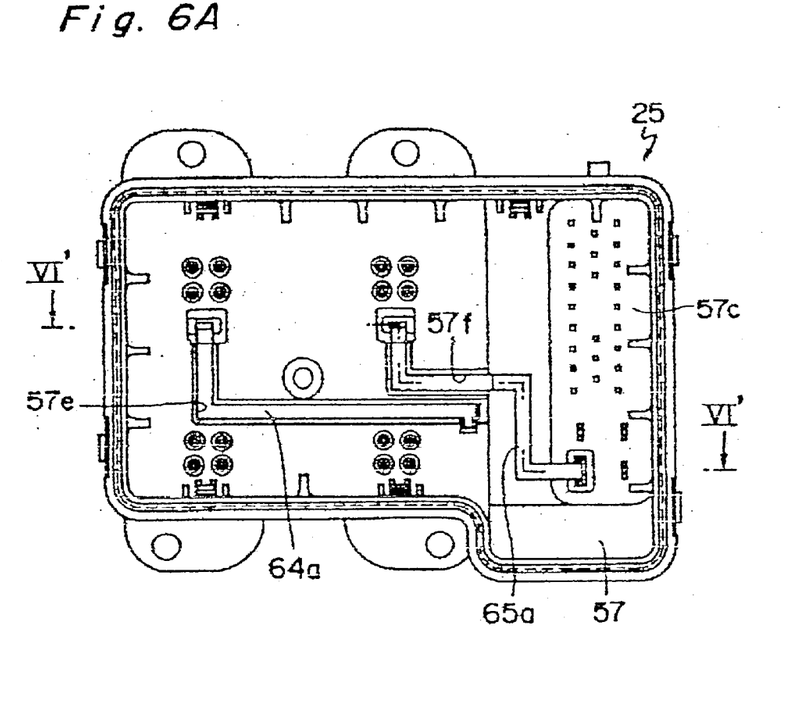
FIG. 6A is sectional view taken along the line VI—VI of FIG. 5A.
Figure 6B:
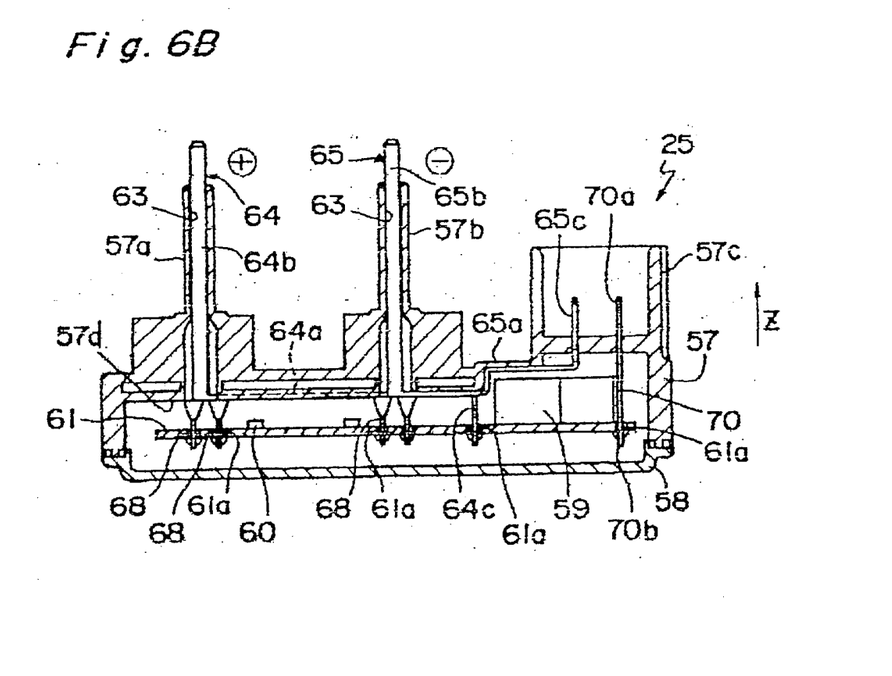
FIG. 6B is a sectional view taken along the line VI'—VI' of FIG. 6A.
Figure 7:
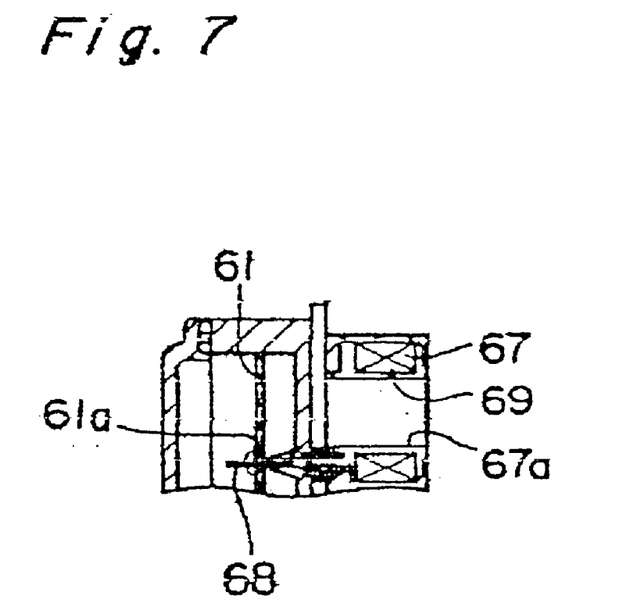
FIG. 7 is a sectional view taken along the line VII—VII of FIG. 5B.
Figure 8:
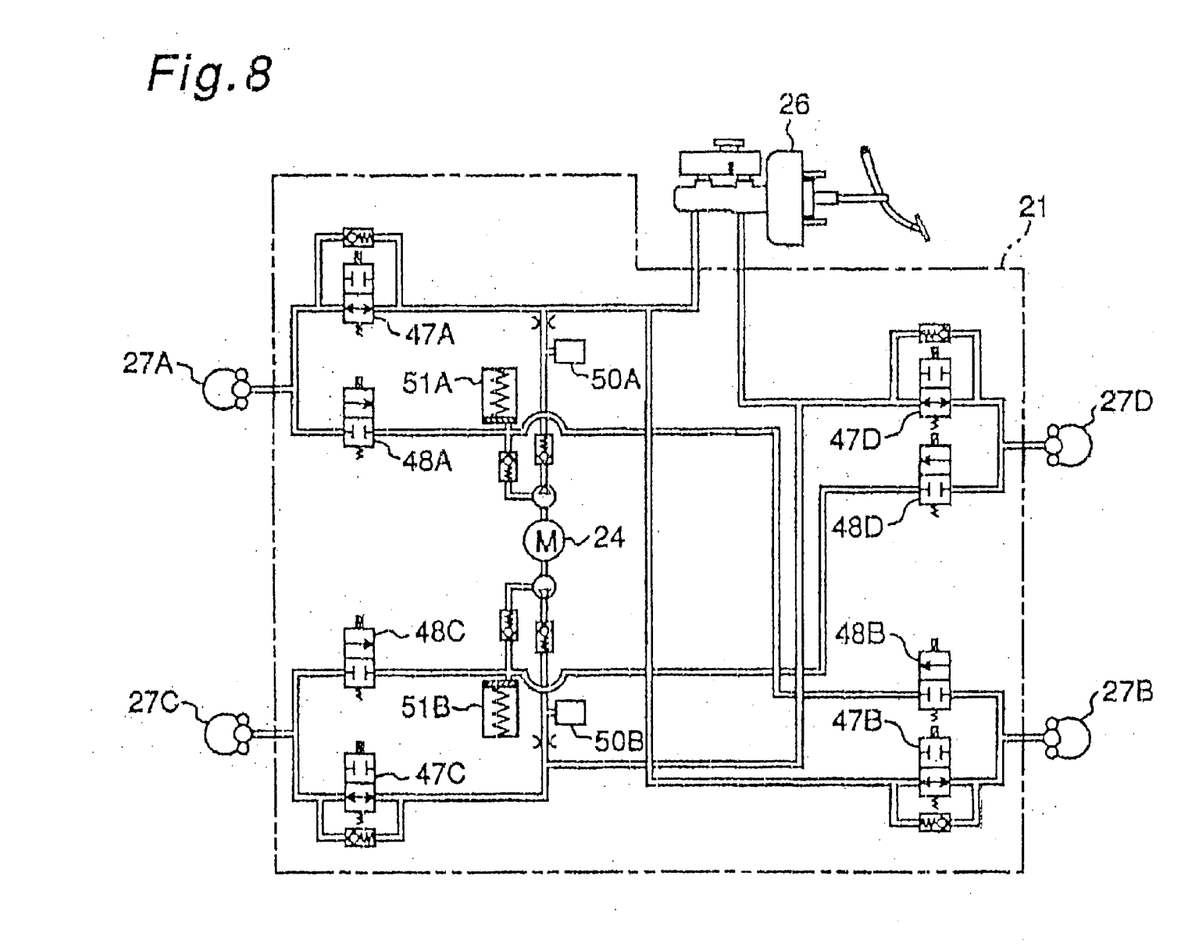
FIG. 8 is a fluid pressure circuit diagram of the brake fluid pressure control apparatus for vehicles.

FIGS. 1 through 3 show a brake fluid pressure control apparatus 21 according to an embodiment of the invention. On one side 22a of the brake fluid pressure control apparatus 21, an electric motor 24 is mounted. On the other side 22b opposing to the side 22a, an electronic control box 25 is mounted. FIG. 4 shows the electric motor 24 and the housing 22. FIGS. 5 through 7 show the electronic control box 25. As shown in FIG. 8, the brake fluid pressure control apparatus 21 is to be interposed between a master cylinder 2 and wheel cylinders 27A, 27B, 27C and 27D.

As shown in FIGS. 1 and 2, a yoke 28 of the electric motor 24 has a flange 28a , which is fixed to the other side 22a of the housing 22 by bolts 29. Further, an opening of the yoke 28 is closed by brash base 30. At a portion where the yoke 28 and the side 22a of the housing 22 abut against each other, a rubber seal member 31 is provide in order to avoid water immersion.

An output axis 32 of the electric motor 24 is rotatably supported by bearings 33, 34, 35 and 36. At a left end of the output axis 32 inserted in the housing 22 an eccentric portion 32a is provided. Further, on the output axis 32, rectifiers 38 and a core 39 around which coils are wounded are press fitted. The core 39 is opposed to permanent magnets attached to an inner surface of the yoke 28.

A pair of electric feeding brushes 41, 42 held by the brush base 30 are elastically urged against the rectifiers 38 by springs 43.

As shown in an enlarged view in FIG. 3, terminal accommodation portions 30a are formed with the brush base 32 near each brush 42. In each terminal accommodation portion 30a, a motor connection female terminal 45 constituted by a known tongue-type female terminal is accommodated. The motor connection female terminal 45 is connected to the brush 42 by pig-tail wires. The female terminal 45 also has an engage finger 45a, which is engaged to a step portion 30c of the terminal accommodation portion 30a to hold the female terminal 45 within the terminal accommodation portion 30a. Shape and size of the terminal accommodation portion 30a and the female terminal 45 are set so that the female terminal 45 can move some distance in the directions indicated by an arrow "W" and perpendicular to the figure, namely the female terminal 45 has a backlash.

As shown in FIGS. 2, 4 and 8, in the housing 22, elements such as normal open electromagnetic valves 47A, 47B, 47C and 47D, normal close electromagnetic valves 48A, 48B, 48C and 48D, a pair of plunger pumps 49A and 49B, pulsation decreasing rooms 50A and 50B, and reservoirs 51A and 51B are accommodated. Further, in the housing 22, passages communicating the master cylinder 26 with the wheel cylinders 27A–27D through the elements are formed. As shown in FIG. 2, a pair of through bores 53A and 53B communicating the side 22a on which the electric motor 24 is mounted with the other side 22b on which the electronic control box 25 is mounted is formed.

As shown in FIGS. 2 and 4, the plunger pumps 49A and 49B are accommodated in the housing 22 so that axes thereof are parallel to the side 22a on which the electric motor 24 is mounted and the side 22b on which the electronic control box 25 is mounted.

One ends of the normal open electromagnetic valves 47A–47D and the normal closed electromagnetic valves 48A–48D are inserted in accommodation bores 22d and 22e formed on the other side 22b toward one side 22a. The other ends of the normal open electromagnetic valves 47A–47D project from the other side of the housing 22. In case of view from the other side 22b, the accommodation bores 22d and 22e are arranged parallel to the axes "L" of the plunger pumps 49A and 49B.

Further, the through bores 53A and 53B are formed at regions surrounded by the plunger pumps 49A and 49B and the normal open electromagnetic valves 47A–47D (indicated by a symbol "y" in FIG. 4B), and arranged in parallel to both the normal open electromagnetic valves 47A–47D and the normal close electromagnetic valves 48A–48D in case of view from the other side 22b.

Such arrangement of the plunger pumps 49A and 49B, the normal open electromagnetic valves 47A–47D, the normal close electromagnetic valves 48A–48D, and the through holes 53A and 53B cause decrease in size of the housing 22 since they are arranged in the housing without loss space. This results in decrease in size and weight of the brake fluid pressure control apparatus 21.

The plunger pumps 49A and 49B are known horizontal opposite and reciprocating type plunger pumps. Each of them are provided with a plunger 55 actuated by the eccentric portion 32a of the output shaft 32 of the electric motor 24.

As shown in FIGS. 5 to 7, an insulation plastic case constituting the electronic control box 25 comprises a main body 57 and a cover 58 detachably attached to the main body 57. Inside the electronic control box 25, control circuit substrate 61 is accommodated, on which relays 59 for actuating the electric motor 24, relays for actuating the normal open electromagnetic valves 47A–47D and normal close electromagnetic valves 48A–48D (not shown), and a microcomputer 60 are accommodated.

Two projections 57a and 57b for electrical connection each having a small diameter cylinder-like shape are projected from the main body 57 of the electronic control box 25 at positions each corresponding to the through bores 53A and 53B of the housing 22. In each of the projections 57a and 57b an insertion bore 63 is formed. The insertion bore 63 elongates from a tip end of each projection 57a and 57b to an internal cavity of the electronic control box 25.

The main body 57 of the electronic control box 25 is also provided with a connector portion 57c for connecting the control circuit within the electronic control box 25 with devices such as a battery and various types of sensors (not shown). As shown in FIGS. 1 and 2, the connector portion 57c is positioned outward to the housing 22 and opened toward the other side 22a of the housing 22 on which the electric motor is mounted.

As shown in FIGS. 6A and 6B, the electronic control box 25 comprises a plus conductive member 64 and a minus conductive member 65. Each of these plus and minus conductive members 64 and 65 is made by punching and bending of a metal plates and bent in band-like configuration.

The plus conductive member 64 is provided with a base portion 64a accommodated in a positioning groove 57e formed on an inner surface 57d of the main body 57. One end of the base portion 64a is bent to form a motor connection male terminal 64b. The motor connection male terminal 64b is elongated through the insertion bore 63 of the projection 57a so that the tip end of the motor connection male terminal 64b projects from the tip end of the projection 57a. On the other hand, the other end of the base portion 64a is bent toward the inner cavity of the electronic control box 25, namely in a direction opposing to that in which the motor connection male terminal 64b projects to form a substrate insertion male terminal 64c. The substrate insertion male terminal 64c is inserted to a through hole 61a of the circuit control substrate 61 and soldered to it.

One end of a base portion 65a of the minus conductive member 65 arranged in a positioning groove 57f is bent orthogonal to form a motor connection male terminal 65b. The motor connection male terminal 65b is elongated through the insertion bore 63 of the projection 57b so that a tip end thereof projects from a tip end of the projection 57b. As shown in FIG. 3, the motor connection male terminal 65 is provided with an engage finger 65d for holding itself in the projection 57. The above mentioned motor connection male terminal 64 also has a similar engage finger (not shown). On the other hand, the other end of the baseportion 65a is bent in the same direction as the motor connection male terminal 65b to form a connector male terminal 65c. This connector male terminal 65c is pressed into the connector portion 57c and to be connected with a plus terminal of the battery (not shown).

As described above, the motor connection male terminal 65b and the connector male terminal 65c are projected in the same direction so that the minus conductive member 65 has an arch-like configuration as shown in FIG. 6B. Owing to such configuration of the minus conductive member 65c, insertion of the male terminal 65b into the insertion bore 57b of the projection 57 and insertion of the male terminal 65c into the connector portion 57c can be executed simultaneously.

As shown in FIGS. 5B and 7, in the main body 57 of the electronic control box 57, coils 67 of the normal open electromagnetic valves 47A–47D and the normal close electromagnetic valves 48A–48D are over-molded with iron plates 69 for forming magnetic circuits. Conductors 68 each connected to the coils 67 are projected into the cavity of the electronic control box 25 and inserted to the through holes 61a to be soldered. End portions of the normal open electromagnetic valves 47A–47D and the normal close electromagnetic valves 48A–48D projecting form the side 22b of the housing 22 (shown in FIG. 4A) are each inserted into a concave 67a of each coil 67.

A conductive member 70 shown in FIG. 6B connects the control circuit substrate 61 with the plus terminal of the battery. A connector male terminal 70a formed at one end of the conductive member 70 is pressed into the connector portion 57c so as to be connected to the plus terminal of the battery. Further, a substrate insertion male terminal 70b formed at the other end of the conductive member 70 is inserted in the through hole 61a of the control circuit substrate 61 and soldered to it.

As shown in FIG. 2, the electronic control box 25 is mounted on the other side of the housing 22. The projections 57a and 57b are each inserted through the through bores 53A and 53B so as to elongate from the other side 22b to one side 22a. O-rings 71 are outwardly engaged to the projections 57a and 57b for preventing water from entering into the electric motor 24 via through holes 57a and 57b.

As shown in FIG. 3, the motor connection male terminals 65b of the minus conductive member 65 is plugged into the motor connection female terminals 45 accommodated in the terminal accommodation portions 30a to achieve electrical connection. Further, the motor connection male terminal 64b of the plus conductive member 64 is plugged into another motor connection female terminal 45 (not shown). Thus, the plus terminal of the battery and the electric motor 24 are electrically connected through the connector male terminal 70a of the conductive member 70, the substrate insertion male terminal 70b of the conductive member 70, circuits provided on the control circuit substrate 61, the substrate insertion male terminal 64c of the plus conductive member 64, the motor connection male terminal 64c of the plus conductive member 64 and the motor connection female terminal 45. On the other hand, the minus terminal of the battery and the electric motor 24 are electrically connected through the connector male terminal 65c of the minus conductive member 65, the motor connection male terminal 65b of the minus conductive member 65 and the motor connection female terminal 45.

In the brake fluid pressure control apparatus for vehicles of the embodiment having above mentioned construction, engagement of the motor connection female terminals 45 and the motor connection male terminals 64b and 65b can be released easily since electric connection between the motor connection female terminals 45 and the male terminals 64b and 65b are achieved by plug insertion. Thus, although assembly of the apparatus is finished, the electric motor 24 and the electronic control box 25 can be easily released for replacement Further, in this apparatus, there are following features, due to the motor connection male terminals 64b and 65b of the electronic control box 25 and the motor connection female terminals 45 of the electric motor 24.

First, since the motor connection female terminals 45 are loosely accommodated, each of the motor connection male terminals 64b and 65b does not need a clearance, namely can be tightly accommodated in the projections 57a and 57b. Thus, the position of the substrate insertion male terminal 64b of the plus conductive member 64 can be firmly determined. Owing to this, when the control circuit substrate 61 is installed in the electronic control box 25, the substrate insertion male terminal 64c can be surely inserted in the through hole 61a at the same time of the insertion of the conductors 68 of the normal open electromagnetic vales 47A–47D and normal close electromagnetic valves 48A–48D into the through holes 61a. This results in easy installation operation of the control circuit substrate 61 to reduce cost. On the other hand, since the motor connection female terminals 45 of the electric motor 24 are loosely inserted, the electrical connection between the electronic control box 25 and the electric motor 24 is easily and firmly achieved.

Secondly, since the electronic control box 25 has the motor connection female terminal 65b differing from the case that the electronic control box has the female terminals (shown in FIG. 12), the motor connection male terminals 65b and the connector male terminal 65c are inserted in the same direction indicated by an arrow "Z". As the result of this, the electric motor 24 and the minus terminal of the battery can be connected by one conductive member, namely by the minus conductive member 65 of an arch-like configuration. Accordingly, comparing with the case that two conductive members 13 and 16 are used as shown in FIG. 12, total number of parts is decreased. Cost is also reduced since there is no need to connect two conductive members by means such as welding. Further, owing to that insertion of the motor connection male terminal 65b in the projection 57b and pressing the connector male terminal 65c in the connector portion 57c can be simultaneously executed, the minus conductive member 65 can be easily attached to the electronic control box 25.

operation of the brake fluid pressure control apparatus for vehicles of the embodiment is similar to that of the conventional apparatus. Namely, the microcomputer 60 actuates the normal open electromagnetic valves 47A–47D, the normal close electromagnetic valves 48A–48D and the electric motor 24 in order to execute brake fluid pressure control such as antilock control and traction control.

The present invention is not limited to abovementioned embodiment and various modifications can be made.

For example, although the projections are preferably integrated to the electronic control box for decreasing the total number of parts as described above, the projections can be formed separately to the electronic control box. Further, the shape of the motor connection female terminals is not limited to the illustrated one as far as the motor connection male terminal can be plugged into it.

Although the present invention has full described in connection with the preferred embodiments thereof with reference to the accompanying drawing, it is to be noted that various changes and modifications are apparent to those skilled in the art. Such changes and modifications are to understood as included within the scope of the invention as defined by the appended claims unless they depart therefrom.

What is claimed is:

1. A brake fluid pressure control apparatus for vehicles comprising:

a housing accommodating a pump and having through bores which elongate from one side to the other side thereof;

an electric motor for actuating the pump mounted on the one side of the housing;

an electronic control box mounted on the other side of the housing and having a control circuit which comprises a driving circuit for the electric motor and a connector portion which has terminals for connection to a battery;

the electronic control box and the electric motor being connected electrically by conductive members inserted in the through holes;

wherein each of the conductive members elongated from the electronic control box and inserted in the through bores has a motor connection male terminal on its tip end, wherein male terminal accommodation portions are provide with the electric motor, in which motor connection male terminals are accommodated, and wherein the motor connection male terminals are plugged in the motor connection female terminal for electrical connection.

2. The brake fluid control apparatus for vehicles of claim 1, wherein the electronic control box is made of insulation plastic, wherein the projections inserted in the through bores are integrally formed on parts of the electronic control box, and wherein each conductive member is inserted in an insertion bore formed in each projection.

3. The brake fluid control apparatus for vehicles of claim 1, wherein the projections inserted in the through bores are formed separately to the electronic control box, and wherein each conductive member is inserted in a insertion bore formed in each projection.

4. The brake fluid control apparatus for vehicles of claim 1, wherein the electric motor is provided with brush bases in order to hold brushes for feeding electric current to rectifiers, wherein each brush base is formed with the female terminal accommodation portion, and wherein each motor connection female terminal accommodated in the female terminal accommodation portion is electrically connected to the brush.

5. The brake fluid control apparatus for vehicles of claim 1, further comprising a control circuit substrate provided with the control circuit, and a conductive member formed with the motor connection male terminal at one end and a substrate insertion terminal at the other end, wherein the substrate insertion terminal is inserted in a through hole provided in the control circuit substrate and soldered to the control circuit substrate.

6. The brake fluid control apparatus for vehicles of claim 1, wherein the connector portion of the electronic control box is positioned outward to the housing and opened toward the other side of the housing on which the electric motor is mounted, wherein the conductive member having the motor connection male terminal at one end is provided with a connector male terminal at the other end to form an arch-like configuration, and wherein the motor connection male terminal is inserted in the insertion bore of the projection and the connector terminal is pressed in the connector portion.

7. The brake fluid control apparatus for vehicles of claim 1, wherein the control circuit is formed on a control circuit substrate, wherein the connector portion of the electronic control box is positioned outward to the housing and opened toward the other side of the housing on which the electric motor is mounted, wherein a plus conductive member provided with the motor connection terminal at one end is provided with a substrate insertion male terminal at the other end, the substrate insertion male terminal being inserted into a through hole formed in the control circuit substrate and soldered to it, and wherein a minus conductive member provided with the motor connection male terminal at one end is provided with a connector terminal at the other end, the minus conductive member having an arch-like configuration, the motor connection male terminal being inserted in the insertion bore of the projection and the connector male terminal being pressed in the connector portion.

8. The brake fluid pressure control apparatus of claim 1 wherein the pump is a horizontal opposite and reciprocating type plunger pump having two plungers, the plunger pump is arranged in the housing so that an axis thereof is parallel to both one side and the other side of the housing, wherein, the electromagnetic valves are accommodated in accommodation bores bored from the other side toward one side and parallel to the axis taking view from the other side, and wherein the through holes are formed in regions surrounded by the plunger pump and the electromagnetic valves taking view from the other side of the housing and parallel to the electromagnetic valves.

* * * * *

UNITED STATES PATENT AND TRADEMARK OFFICE
CERTIFICATE OF CORRECTION

PATENT NO.    : 6,224,169 B1
DATED         : May 1, 2001
INVENTOR(S)   : K. Aoki et al.

It is certified that error appears in the above-identified patent and that said Letters Patent is hereby corrected as shown below:

<u>Title page,</u>
Item [73], Assignee, after "Industries" insert -- , --.

Signed and Sealed this

Twenty-sixth Day of March, 2002

Attest:

Attesting Officer

JAMES E. ROGAN
Director of the United States Patent and Trademark Office